United States Patent
Tang et al.

(10) Patent No.: US 12,277,703 B2
(45) Date of Patent: Apr. 15, 2025

(54) IMAGE PROCESSING METHOD AND DEVICE, ELECTRONIC APPARATUS AND READABLE STORAGE MEDIUM

(71) Applicant: BOE Technology Group Co., Ltd., Beijing (CN)

(72) Inventors: Dawei Tang, Beijing (CN); Jijing Huang, Beijing (CN); Zhiliang Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 424 days.

(21) Appl. No.: 17/785,173

(22) PCT Filed: Sep. 10, 2021

(86) PCT No.: PCT/CN2021/117703
§ 371 (c)(1),
(2) Date: Jun. 14, 2022

(87) PCT Pub. No.: WO2022/089039
PCT Pub. Date: May 5, 2022

(65) Prior Publication Data
US 2023/0009202 A1  Jan. 12, 2023

(30) Foreign Application Priority Data
Oct. 30, 2020  (CN) .......................... 202011194009.2

(51) Int. Cl.
*G06T 7/00* (2017.01)
*G06V 10/44* (2022.01)
(Continued)

(52) U.S. Cl.
CPC ............ *G06T 7/0012* (2013.01); *G06V 10/44* (2022.01); *G06V 10/7715* (2022.01);
(Continued)

(58) Field of Classification Search
CPC ......... G06T 7/0012; G06T 2207/10116; G06T 2207/30096; G06T 7/11; G06T 7/12;
(Continued)

(56) References Cited

U.S. PATENT DOCUMENTS 7,675,524 B1 * 3/2010 Miller ....................... G06T 5/20
345/581
2018/0322629 A1 * 11/2018 Hu ......................... G06N 20/00
(Continued)

FOREIGN PATENT DOCUMENTS

CN   106156744 A    11/2016
CN   110210571 A *  9/2019 ............... G06K 9/46
(Continued)

OTHER PUBLICATIONS

PCT/CN2021/117703 international search report and written opinion.

*Primary Examiner* — Utpal D Shah
*Assistant Examiner* — Jack Peter Kraynak
(74) *Attorney, Agent, or Firm* — IPro, PLLC

(57) ABSTRACT

The present disclosure provides an image processing method, an image processing device, an electronic apparatus and a readable storage medium. The image processing method includes: obtaining feature map data of an input image; extracting a feature region in the feature map data in accordance with a size of a convolution kernel; performing windowing processing on the feature region; and obtaining a windowed feature map of the input image in accordance with the feature region obtained after the windowing processing.

14 Claims, 2 Drawing Sheets

(51) Int. Cl.
*G06V 10/77* (2022.01)
*G06V 10/94* (2022.01)

(52) U.S. Cl.
CPC .... *G06V 10/94* (2022.01); *G06T 2207/10116* (2013.01); *G06T 2207/30096* (2013.01)

(58) Field of Classification Search
CPC .... G06V 10/7715; G06V 10/94; G06V 10/44; G06V 10/25
See application file for complete search history.

(56) References Cited

U.S. PATENT DOCUMENTS

| | | | |
|---|---|---|---|
| 2020/0272841 A1* | 8/2020 | Han | G06T 7/0012 |
| 2020/0342232 A1* | 10/2020 | Yang | H04N 19/124 |
| 2021/0011970 A1* | 1/2021 | Han | G06F 17/15 |
| 2021/0019591 A1* | 1/2021 | Venkatesh | G06N 3/08 |
| 2022/0019844 A1* | 1/2022 | Park | G06N 3/04 |
| 2022/0392202 A1* | 12/2022 | Liu | G06V 10/7715 |

FOREIGN PATENT DOCUMENTS

| | | | | |
|---|---|---|---|---|
| CN | 111563580 A | * | 8/2020 | ............ G06N 3/045 |
| CN | 111754439 A | | 10/2020 | |
| CN | 111831254 A | | 10/2020 | |
| CN | 112308837 A | | 2/2021 | |
| WO | WO-2020178702 A1 | * | 9/2020 | ............ G01S 17/10 |
| WO | WO-2020199476 A1 | * | 10/2020 | ............ G06N 3/045 |

* cited by examiner

IMAGE PROCESSING METHOD AND DEVICE, ELECTRONIC APPARATUS AND READABLE STORAGE MEDIUM

CROSS-REFERENCE TO RELATED APPLICATION

This application is the U.S. national phase of PCT Application No. PCT/CN2021/117703 filed on Sep. 10, 2021, which claims a priority of the Chinese patent application No. 202011194009.2 filed on Oct. 30, 2020, which is incorporated herein by reference in its entirety.

TECHNICAL FIELD

The present disclosure relates to the field of image processing technology, in particular to an image processing method, an image processing device, an electronic apparatus and a readable storage medium.

BACKGROUND

In the process of diagnosis and treatment, it is necessary to analyze an imaging result of an X-ray image to obtain possible lesion data. In the related art, an image processing speed is relatively slow, and it is difficult to analyze the X-ray image in real time.

SUMMARY

An object of the present disclosure is to provide an image processing method, an image processing device, an electronic apparatus and a readable storage medium, so as to solve the problem in the related art where the image processing speed is relatively slow and it is difficult to analyze the X-ray image in real time.

In one aspect, the present disclosure provides in some embodiments an image processing method, including: obtaining feature map data of an input image; extracting a feature region in the feature map data in accordance with a size of a convolution kernel; performing windowing processing on the feature region; and obtaining a windowed feature map of the input image in accordance with the feature region obtained after the windowing processing.

In a possible embodiment of the present disclosure, the performing the windowing processing on the feature region includes inputting feature sub-data corresponding to the feature region in feature data into M groups of flip-flops sequentially to obtain a windowed feature sub-map corresponding to the feature region. Each group of flip-flops includes N flip-flops, a value of M is the same as a size of the convolution kernel in a first direction, a value of N is the same as a size of the convolution kernel in a second direction, and the first direction is different from the second direction.

In a possible embodiment of the present disclosure, the inputting the feature sub-data corresponding to the feature region in the feature data into M groups of flip-flops sequentially to obtain the windowed feature sub-map corresponding to the feature region includes inputting input data into an $L^{th}$ group of flip-flops to obtain output data from the $L^{th}$ group of flip-flops, where L is greater than or equal to 1 and smaller than or equal to M, the input data includes feature data in an $(M-L+1)^{th}$ row in the feature sub-data of the feature region, and the output data from the $L^{th}$ group of flip-flops is a windowed feature sub-map of the feature data in the $(M-L+1)^{th}$ row.

In a possible embodiment of the present disclosure, the obtaining the windowed feature map of the input image in accordance with the feature region obtained after the windowing processing includes: obtaining a weight coefficient corresponding to each windowed feature sub-map; windowing the weight coefficient; and performing convolution operation on the windowed weight coefficient and the windowed feature sub-map through the convolution kernel to obtain the windowed feature map of the feature region.

In a possible embodiment of the present disclosure, the extracting the feature region in the feature map data in accordance with the size of the convolution kernel includes: establishing an extraction window with a same size as the convolution kernel; and extracting the feature regions in the feature map in accordance with a predetermined step value sequentially in the feature map data, a size of each feature region being the same as the size of the extraction window.

In another aspect, the present disclosure provides in some embodiments an image processing device, including: a feature map data obtaining module configured to obtain feature map data of an input image; a feature region extraction module configured to extract a feature region in the feature map data in accordance with a size of a convolution kernel; a windowing processing module configured to perform windowing processing on the feature region; and a windowed feature map obtaining module configured to obtain a windowed feature map of the input image in accordance with the feature region obtained after the windowing processing.

In a possible embodiment of the present disclosure, the windowing processing module is specifically configured to input feature sub-data corresponding to the feature region in feature data into M groups of flip-flops sequentially to obtain a windowed feature sub-map corresponding to the feature region. Each group of flip-flops includes N flip-flops, a value of M is the same as a size of the convolution kernel in a first direction, a value of N is the same as a size of the convolution kernel in a second direction, and the first direction is different from the second direction.

In a possible embodiment of the present disclosure, the windowing processing module is specifically configured to input input data into an $L^{th}$ group of flip-flops to obtain output data from the $L^{th}$ group of flip-flops, where L is greater than or equal to 1 and smaller than or equal to M, the input data includes feature data in an $(M-L+1)^{th}$ row in the feature sub-data of the feature region, and the output data from the $L^{th}$ group of flip-flops is a windowed feature sub-map of the feature data in the $(M-L+1)^{th}$ row.

In a possible embodiment of the present disclosure, the windowed feature map obtaining module includes: a weight coefficient obtaining sub-module configured to obtain a weight coefficient corresponding to each windowed feature sub-map; a weight coefficient windowing sub-module configured to window the weight coefficient; and a convolution sub-module configured to perform convolution operation on the windowed weight coefficient and the windowed feature sub-map through the convolution kernel to obtain the windowed feature map of the feature region.

In a possible embodiment of the present disclosure, the feature region extraction module includes: an extraction window establishing sub-module configured to establish an extraction window with a same size as the convolution kernel; and an extraction sub-module configured to extract the feature regions in the feature map in accordance with a predetermined step value sequentially in the feature map data, a size of each feature region being the same as the size of the extraction window.

In yet another aspect, the present disclosure provides in some embodiments an electronic apparatus, including an X-ray transmission and reception unit configured to generate an input image, a processor, a communication interface, a memory and a communication bus. The processor, the communication interface and the memory communicate with each other through the communication bus, the memory is configured to store therein a computer program, and the processor is configured to execute the computer program in the memory so as to implement the above-mentioned image processing method.

In still yet another aspect, the present disclosure provides in some embodiments a readable storage medium storing therein a computer program, and the computer program is executed by a processor so as to implement the above-mentioned image processing method.

According to the embodiments of the present disclosure, the feature map data of the input image is obtained, the feature region in the feature map data is extracted in accordance with the size of convolution kernel, the windowing processing is performed on the feature region, and the windowed feature map of the input image is obtained in accordance with the feature region obtained after the windowing processing. In the embodiments of the present disclosure, the feature region is extracted in accordance with the size of the convolution kernel, the windowing processing is performed on each feature region, and then the windowed feature map of the input image is generated in accordance with the feature region obtained after the windowing processing. As compared with the related art where the feature a data cached in the memory is read and processed by the processor, it is able to increase the data processing speed, thereby to process the image in real time.

BRIEF DESCRIPTION OF THE DRAWINGS

In order to illustrate the technical solutions of the embodiment of the present disclosure in a clearer manner, the drawings desired for the embodiment of the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
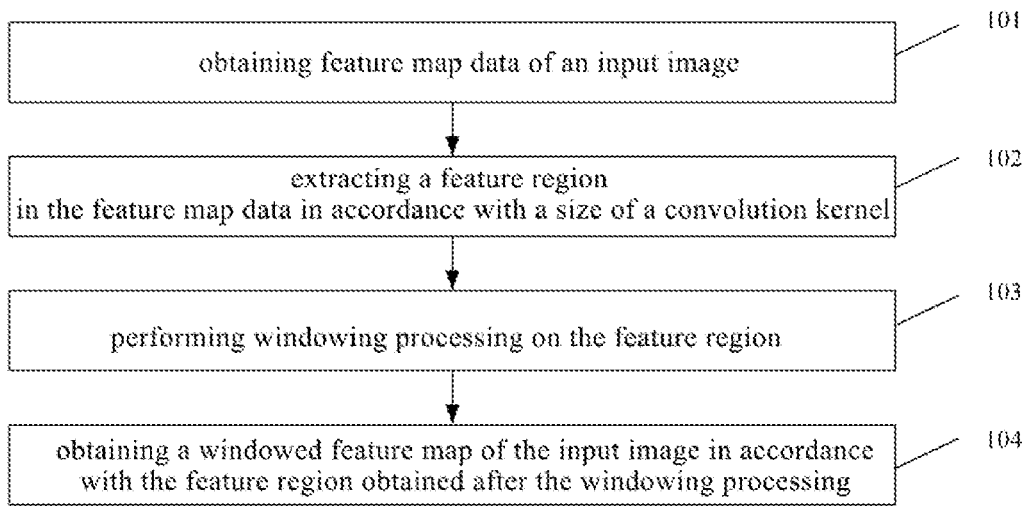
FIG. 1 is a flow chart of an image processing method according to one embodiment of the present disclosure.

The present disclosure provides in some embodiments an image processing method which, as shown in FIG. 1, includes the following steps.

Step 101: obtaining feature map data of an input image.

In the embodiments of the present disclosure, the input image may be an image generated in the X-ray detection, and information in the input image, e.g., information about possible lesions, may be obtained through analyzing the input image. In the embodiments of the present disclosure, an original image of the input image is processed preliminarily, e.g., subjected to convolution operation through a convolution layer, so as to obtain the feature map data of the original image.

Step 102: extracting a feature region in the feature map data in accordance with a size of a convolution kernel.

In order to analyze the input image, it is necessary to perform windowing processing on the input image. In the embodiments of the present disclosure, the description is given when the size of the feature map data is 6*6 and the size of the convolution kernel is 3*3.

In the embodiments of the present disclosure, the size of the feature map data is determined in accordance with the input image, and the size of the convolution kernel is not limited to 3*3.

It should be appreciated that, the size of the convolution kernel is generally an m*n*k matrix, where m and n are determined in accordance with a shape of the convolution kernel (in the embodiments of the present disclosure, the convolution kernel is of a square shape with a size of 3*3, i.e., m and n are both equal to 3), and k represents the quantity of color channels of a pixel. For example, for an image including three channels of red, green and blue (RGB), k is equal to 3. An influence of the color channels is not considered in the embodiments of the present disclosure, so the value of k is omitted. During implementation, the size and shape of the convolution kernel are set according to the practical need, and then the corresponding values of m and n are determined, which will not be particularly defined herein.

In the embodiments of the present disclosure, Step 102 specifically includes: establishing an extraction window with a same size as the convolution kernel; and extracting the feature region in the feature map in accordance with a predetermined step value sequentially in the feature map data. The size of each feature region is the same as the size of the extraction window.

Figure 2:
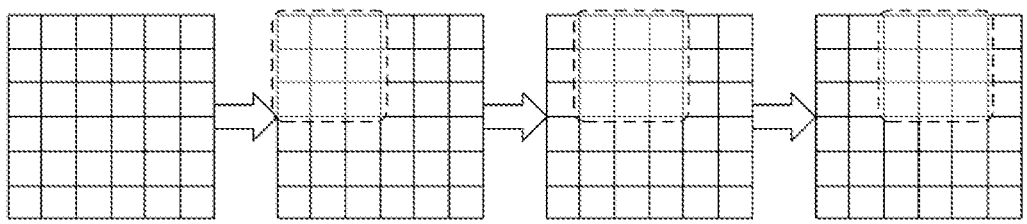
FIG. 2 is a schematic view showing the extraction of a feature region according to one embodiment of the present disclosure.

As shown in FIG. 2, the extraction window with a same size as the convolution kernel is established, i.e., a dashed box corresponding to the 3*3 convolution kernel. Obviously, when the size of the convolution kernel is changed, the size of the extraction window is changed too. For example, when the size of the convolution kernel is 4*4, the size of the extraction window is adjusted to 4*4, and so on.

Next, a feature region is extracted from a starting position, i.e., an upper left corner of the feature map data, using an extraction window with a size of 3*3, and each feature region includes 9 pixels. After the extraction of a first feature region, the extraction window is moved to the right by a length of one pixel to extract a next feature region, until a last feature region in a first row has been extracted. Then, the extraction window is moved down by the length of one pixel to extract the feature regions in a second row.

In the embodiments of the present disclosure, the step value between two adjacent feature regions is set as, but not limited to, one pixel. For example, the step value may also be set as two or three pixels, which will not be particularly defined herein.

Step 103: performing windowing processing on the feature region.

After the extraction of the feature region in the feature map data, the windowing processing is performed on each feature region to obtain the windowed sub-data corresponding to each feature region.

In a possible embodiment of the present disclosure, Step 103 specifically includes inputting feature sub-data corresponding to the feature region in the feature data into M groups of flip-flops sequentially to obtain a windowed feature sub-map corresponding to the feature region.

The flip-flop refers to an information storage element with a memory function and two stable states.

In the embodiments of the present disclosure, the flip-flop specifically refers to a data flip-flop or delay flip-flop (D flip-flop), and the D Flip-flop includes four NAND gates.

In the embodiments of the present disclosure, each group of flip-flops includes N flip-flops, a value of M is the same as a size of the convolution kernel in a first direction, a value of N is the same as a size of the convolution kernel in a second direction, and the first direction is different from the second direction.

In the embodiments of the present disclosure, the first direction refers to a longitudinal direction in FIG. 2, and the second direction refers to a lateral direction in FIG. 2. In FIG. 2, the convolution kernel in the longitudinal direction includes three pixels, so M is equal to 3, i.e., there are three groups of flip-flops. The convolution kernel in the lateral direction includes three pixels, so N is equal to 3, i.e., every three flip-flops form a group of flip-flops. During the implementation, when the size of the convolution kernel is changed, the quantity of groups of flip-flops and the quantity of flip-flops in each group are to be adjusted.

In the embodiments of the present disclosure, the feature sub-data refers to a part of the feature data corresponding to one feature region. For example, the full data corresponding to all the 6*6 pixels in FIG. 2 is the feature data. Referring to the second figure on the left in FIG. 2, the content of the feature data corresponding to the nine pixels in the dashed box is the feature sub-data that corresponds to the feature region in the dashed box.

Through inputting the feature sub-data into the D flip-flops, it is able to window the feature sub-data so as to obtain the windowed feature sub-map.

In the embodiments of the present disclosure, Step 103 specifically includes inputting input data into an $L^{th}$ group of flip-flops to obtain output data from the $L^{th}$ group of flip-flops, where L is greater than or equal to 1 and smaller than or equal to M, the input data includes feature data in an $(M-L+1)^{th}$ row in the feature sub-data of the feature region, and the output data from the $L^{th}$ group of flip-flops is a windowed feature sub-map of the feature data in the $(M-L+1)^{th}$ row.

In the embodiments of the present disclosure, the size of the convolution kernel is 3*3, the size of the feature region is 3*3, the quantity of the groups of flip-flops is 3, and the quantity of flip-flops in each group is 3, i.e., the value of M and the value of N are both 3.

Figure 3:
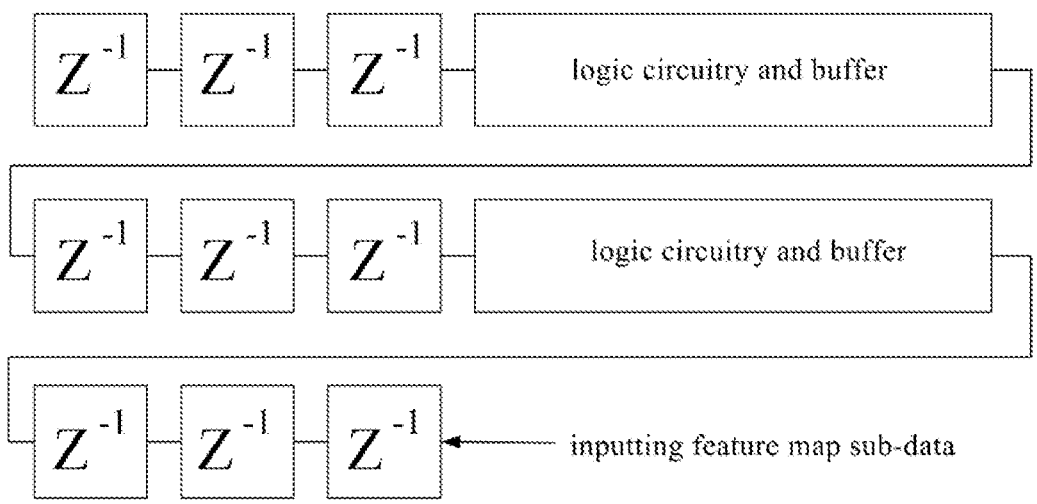
FIG. 3 is a schematic view showing an image processing circuitry according to one embodiment of the present disclosure.

As shown in FIG. 3, $Z^{-1}$ represents different D flip-flops.

In the case that L is equal to 1, M−L+1 is equal to 3, the input data of a first group of flip-flops is the feature sub-data. After the feature sub-data has been inputted into the first group of flip-flops, the output data of the first group of flip-flops is the windowed feature sub-map of the feature data in a third row in the feature region.

The data processing of the flip-flop may be understood as a first-in last-out process. To be specific, the data inputted into the first group of flip-flops includes all the sub-data in the feature sub-data of the feature region. The feature data in the first row in the data feature region is inputted into the first group of flip-flops at first, and the feature data in the third row is inputted into the first group of flip-flops finally. Based on a first-in last-out principle, the feature data in the third row is processed by the first group of flip-flops at first, so as to obtain the windowed feature sub-map of the feature data in the third row.

A content outputted by the first group of flip-flops includes the windowed feature sub-map of the feature data in the third row, further includes an unprocessed part in the feature sub-data of the feature region, i.e., the feature data in the first row and the feature data in a second row.

Under the control of a first logic circuitry, the feature data in the first row and the feature data in the second row are input to a first buffer. In the embodiments of the present disclosure, a first valid indication signal is provided, and it includes a first write enable signal and a first read enable signal. Under the control of the first write enable signal, the feature data in the first row and the feature data in the second row are written into the first buffer, and under the control of the first read enable signal, the feature data in the first row and the feature data in the second row are read and written into the second group of flip-flops. The feature data in the first row is written into the second group of flip-flops prior to the feature data in the second row. Correspondingly, the feature data in the second row is processed by the second group of flip-flops to output the windowed feature sub-map of the feature data in the second row.

Under the control of a second logic circuitry, the feature data in the first row is inputted into a second buffer. A second valid indication signal is provided, and it includes a second write enable signal and a second read enable signal. Under the control of the second write enable signal, the feature data in the first row is written into the second buffer, and under the control of the second read enable signal, the feature data in the first row is read and written into the third group of flip-flops. The feature data in the first row is processed by the third group of flip-flops to output the windowed feature sub-map of the feature data in the first row.

When the quantity of groups of flip-flops is adjusted, a similar operation may be performed, so as to obtain the windowed feature sub-map of the feature data in each row in the feature region.

Step 104: obtaining a windowed feature map of the input image in accordance with the feature region obtained after the windowing processing.

After obtaining the windowed sub-data of each feature region, the windowed feature map of the input image is generated in accordance with all the windowed sub-data.

In the embodiments of the present disclosure, Step 104 includes: obtaining a weight coefficient corresponding to each windowed feature sub-map; windowing the weight coefficient; and performing convolution operation on the windowed weight coefficient and the windowed feature sub-map through the convolution kernel to obtain the windowed feature map of the feature region.

Figure 4:
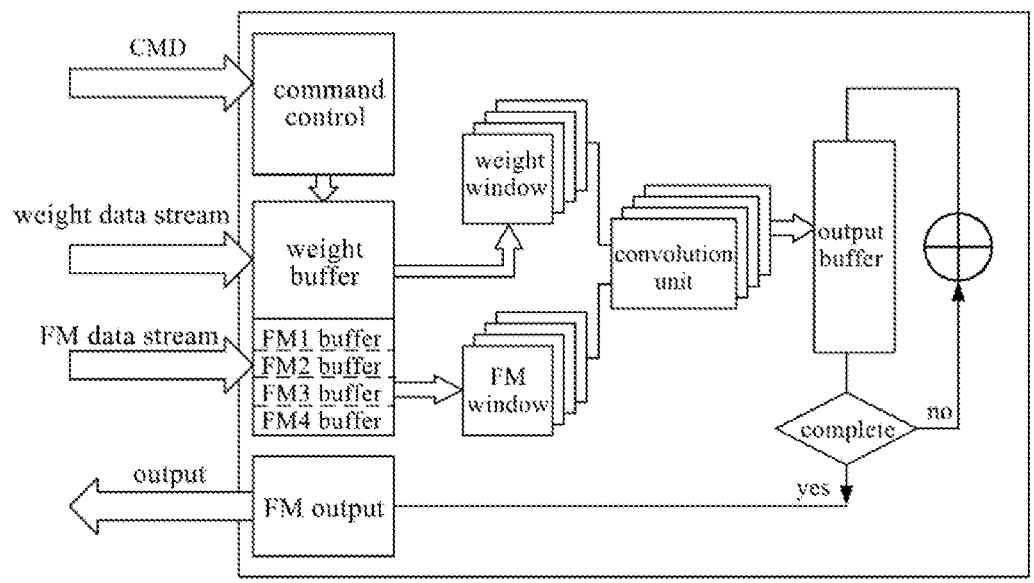
FIG. 4 is a schematic view showing the image processing method according to one embodiment of the present disclosure.

In the embodiments of the present disclosure, the weight coefficient is set for each windowed feature sub-map in the feature region. As shown in FIG. 4, the weight coefficient is inputted in the form of data streams. The weight coefficient is stored in a weight buffer at first, and then the weight coefficient is windowed, e.g., through serial-parallel conversion, so as to match the windowed feature sub-map.

The feature map data inputted in the above process is also maintained in the corresponding buffer. As shown in FIG. 4, a feature map (FM) data stream refers to a data stream corresponding to the feature map data of the input image. After the data stream has been processed through the above steps, the plurality of pieces of feature sub-data corresponding to each feature region is obtained, i.e., the FM1 buffer, FM2 buffer, and so on. Each FMn buffer corresponds to one piece of feature sub-data in the feature region, e.g., the feature sub-data of data in one row in $n^{th}$ feature region in FIG. 2, where n is a positive integer.

Next, the feature sub-data is windowed to obtain a corresponding FM window, i.e., the plurality of windowed feature sub-maps corresponding to the feature region.

Finally, the windowed weight coefficient and the windowed feature sub-map are inputted into a convolution unit for processing, and the processed windowed sub-data is maintained in an output buffer temporarily.

After all the windowed feature sub-maps corresponding to one feature region have been processed, the windowed feature sub-maps are combined to obtain the windowed feature map of the feature region, i.e., an FM output in FIG. 4. At this time, the windowed feature map is outputted to a designated port according to the practical need for subsequent processing.

The above process may be controlled using a control command inputted through a command prompt (CMD), or controlled in any other ways, which will not be particularly defined herein.

According to the embodiments of the present disclosure, the feature map data of the input image is obtained, the feature region in the feature map data is extracted in accordance with the size of convolution kernel, the windowing processing is performed on the feature region, and the windowed feature map of the input image is obtained in accordance with the feature region obtained after the windowing processing. In the embodiments of the present disclosure, the feature region is extracted in accordance with the size of the convolution kernel, the windowing processing is performed on each feature region, and then the windowed feature map of the input image is generated in accordance with the feature region obtained after the windowing processing. As compared with the related art where the feature a data cached in the memory is read and processed by the processor, it is able to increase the data processing speed, thereby to process the image in real time.

Figure 5:
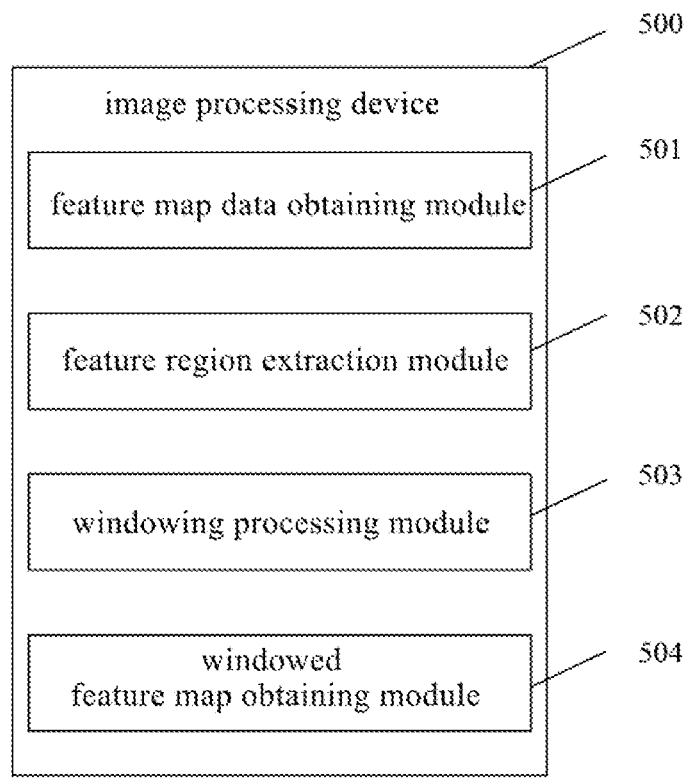
FIG. 5 is a schematic view showing an image processing device according to one embodiment of the present disclosure.

The present disclosure further provides in some embodiments an image processing device 500 which, as shown in FIG. 5, includes: a feature map data obtaining module 501 configured to obtain feature map data of an input image; a feature region extraction module 502 configured to extract a feature region in the feature map data in accordance with a size of a convolution kernel; a windowing processing module 503 configured to perform windowing processing on the feature region; and a windowed feature map obtaining module 504 configured to obtain a windowed feature map of the input image in accordance with the feature region obtained after the windowing processing.

In the embodiments of the present disclosure, the windowing processing module 503 is specifically configured to input feature sub-data corresponding to the feature region in feature data into M groups of flip-flops sequentially to obtain a windowed feature sub-map corresponding to the feature region. Each group of flip-flops includes N flip-flops, a value of M is the same as a size of the convolution kernel in a first direction, a value of N is the same as a size of the convolution kernel in a second direction, and the first direction is different from the second direction.

In the embodiments of the present disclosure, the windowing processing module 503 is specifically configured to input input data into an $L^{th}$ group of flip-flops to obtain output data from the $L^{th}$ group of flip-flops, where L is greater than or equal to 1 and smaller than or equal to M, the input data includes feature data in an $(M-L+1)^{th}$ row in the feature sub-data of the feature region, and the output data from the $L^{th}$ group of flip-flops is a windowed feature sub-map of the feature data in the $(M-L+1)^{th}$ row.

In the embodiments of the present disclosure, the windowed feature map obtaining module 504 includes: a weight coefficient obtaining sub-module configured to obtain a weight coefficient corresponding to each windowed feature sub-map; a weight coefficient windowing sub-module configured to window the weight coefficient; and a convolution sub-module configured to perform convolution operation on the windowed weight coefficient and the windowed feature sub-map through the convolution kernel to obtain the windowed feature map of the feature region.

In the embodiments of the present disclosure, the feature region extraction module 502 includes: an extraction window establishing sub-module configured to establish an extraction window with a same size as the convolution kernel; and an extraction sub-module configured to extract the feature regions in the feature map in accordance with a predetermined step value sequentially in the feature map data, a size of each feature region being the same as the size of the extraction window.

The present disclosure further provides in some embodiments an electronic apparatus, including an X-ray transmission and reception unit configured to generate an input image, a processor, a communication interface, a memory and a communication bus. The processor, the communication interface and the memory communicate with each other through the communication bus, the memory is configured to store therein a computer program, and the processor is configured to execute the computer program in the memory so as to implement the above-mentioned image processing method.

The present disclosure further provides in some embodiments a readable storage medium storing therein a computer program, and the computer program is executed by a processor so as to implement the above-mentioned image processing method.

The image processing device, the electronic apparatus and the readable storage medium may implement the steps in the above-mentioned image processing method with a same or similar technical effect, which will not be particularly defined herein.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An image processing method, wherein the image processing method is used for processing an X-ray image, comprising:
   obtaining feature map data of an input image; wherein the input image is an image generated in the X-ray detection;

extracting a feature region in the feature map data in accordance with a size of a convolution kernel;
performing windowing processing on the feature region; and
obtaining a windowed feature map of the input image in accordance with the feature region obtained after the windowing processing;
wherein the performing the windowing processing on the feature region comprises inputting feature sub-data corresponding to the feature region in feature data into M groups of flip-flops sequentially to obtain a windowed feature sub-map corresponding to the feature region, wherein each group of flip-flops comprises N flip-flops, a value of M is the same as a size of the convolution kernel in a first direction, a value of N is the same as a size of the convolution kernel in a second direction, and the first direction is different from the second direction.

2. The image processing method according to claim 1, wherein the inputting the feature sub-data corresponding to the feature region in the feature data into M groups of flip-flops sequentially to obtain the windowed feature sub-map corresponding to the feature region comprises inputting input data into an Lth group of flip-flops to obtain output data from the Lth group of flip-flops, where L is greater than or equal to 1 and smaller than or equal to M, the input data comprises feature data in an (M−L+1)th row in the feature sub-data of the feature region, and the output data from the Lth group of flip-flops is a windowed feature sub-map of the feature data in the (M−L+1)th row.

3. The image processing method according to claim 2, wherein the obtaining the windowed feature map of the input image in accordance with the feature region obtained after the windowing processing comprises: obtaining a weight coefficient corresponding to each windowed feature sub-map; windowing the weight coefficient; and performing convolution operation on the windowed weight coefficient and the windowed feature sub-map through the convolution kernel to obtain the windowed feature map of the feature region.

4. The image processing method according to claim 1, wherein the extracting the feature region in the feature map data in accordance with the size of the convolution kernel comprises: establishing an extraction window with a same size as the convolution kernel; and extracting the feature regions in the feature map in accordance with a predetermined step value sequentially in the feature map data, a size of each feature region being the same as the size of the extraction window.

5. An image processing device, wherein the image processing device is used for processing an X-ray image, comprising a processor and a memory, wherein the memory is configured to store a computer program, and the processor is configured to call the computer program so as to implement:
obtaining feature map data of an input image; wherein the input image is an image generated in the X-ray detection;
extracting a feature region in the feature map data in accordance with a size of a convolution kernel;
performing windowing processing on the feature region; and
obtaining a windowed feature map of the input image in accordance with the feature region obtained after the windowing processing;
wherein when performing the windowing processing on the feature region, the processor is configured to call the computer program so as to implement: inputting feature sub-data corresponding to the feature region in feature data into M groups of flip-flops sequentially to obtain a windowed feature sub-map corresponding to the feature region, wherein each group of flip-flops comprises N flip-flops, a value of M is the same as a size of the convolution kernel in a first direction, a value of N is the same as a size of the convolution kernel in a second direction, and the first direction is different from the second direction.

6. The image processing device according to claim 5, wherein when inputting the feature sub-data corresponding to the feature region in the feature data into M groups of flip-flops sequentially to obtain the windowed feature sub-map corresponding to the feature region, the processor is configured to call the computer program so as to implement: inputting input data into an Lth group of flip-flops to obtain output data from the Lth group of flip-flops, where L is greater than or equal to 1 and smaller than or equal to M, the input data comprises feature data in an (M−L+1)th row in the feature sub-data of the feature region, and the output data from the Lth group of flip-flops is a windowed feature sub-map of the feature data in the (M−L+1)th row.

7. The image processing device according to claim 6, wherein when obtaining the windowed feature map of the input image in accordance with the feature region obtained after the windowing processing, the processor is configured to call the computer program so as to implement: obtaining a weight coefficient corresponding to each windowed feature sub-map; windowing the weight coefficient; and performing convolution operation on the windowed weight coefficient and the windowed feature sub-map through the convolution kernel to obtain the windowed feature map of the feature region.

8. The image processing device according to claim 5, wherein when extracting the feature region in the feature map data in accordance with the size of the convolution kernel, the processor is configured to call the computer program so as to implement: establishing an extraction window with a same size as the convolution kernel; and extracting the feature regions in the feature map in accordance with a predetermined step value sequentially in the feature map data, a size of each feature region being the same as the size of the extraction window.

9. An electronic apparatus, comprising an X-ray transmission and reception unit configured to generate an input image, a processor, a communication interface, a memory and a communication bus, wherein the processor, the communication interface and the memory communicate with each other through the communication bus, the memory is configured to store therein a computer program, and the processor is configured to execute the computer program in the memory so as to implement the image processing method according to claim 1.

10. A non-transitory readable storage medium storing therein a computer program, wherein the computer program is executed by a processor so as to implement the image processing method according to claim 1.

11. The image processing method according to claim 2, wherein the extracting the feature region in the feature map data in accordance with the size of the convolution kernel comprises: establishing an extraction window with a same size as the convolution kernel; and extracting the feature regions in the feature map in accordance with a predetermined step value sequentially in the feature map data, a size of each feature region being the same as the size of the extraction window.

12. The image processing method according to claim 3, wherein the extracting the feature region in the feature map data in accordance with the size of the convolution kernel comprises: establishing an extraction window with a same size as the convolution kernel; and extracting the feature regions in the feature map in accordance with a predetermined step value sequentially in the feature map data, a size of each feature region being the same as the size of the extraction window.

13. The image processing device according to claim 6, wherein when extracting the feature region in the feature map data in accordance with the size of the convolution kernel, the processor is configured to call the computer program so as to implement: establishing an extraction window with a same size as the convolution kernel; and extracting the feature regions in the feature map in accordance with a predetermined step value sequentially in the feature map data, a size of each feature region being the same as the size of the extraction window.

14. The image processing device according to claim 7, wherein when extracting the feature region in the feature map data in accordance with the size of the convolution kernel, the processor is configured to call the computer program so as to implement: establishing an extraction window with a same size as the convolution kernel; and extracting the feature regions in the feature map in accordance with a predetermined step value sequentially in the feature map data, a size of each feature region being the same as the size of the extraction window.

* * * * *